United States Patent [19]

Dültgen et al.

[11] 4,073,841
[45] Feb. 14, 1978

[54] PROCESS FOR UNIFORMLY FILLING CAVITIES WITH A FOAM INSULATING MATERIAL

[75] Inventors: Gerd Dültgen, Dabringhausen; Wolfgang Schmidt, Cologne, both of Germany

[73] Assignee: Bayer Aktiengesellschaft, Leverkusen, Germany

[21] Appl. No.: 619,090

[22] Filed: Oct. 2, 1975

[51] Int. Cl.² ............................................. B29D 27/04
[52] U.S. Cl. ................................ 264/46.6; 23/288 R; 260/2.5 BC; 260/2.5 BD; 264/469; 264/53; 264/DIG. 5
[58] Field of Search ...................... 264/54, 46.5, 46.6, 264/45.7, 45.8, 40.1, 53, DIG. 5; 23/288 R; 260/2.5 BC, 2.5 BD

[56] References Cited

U.S. PATENT DOCUMENTS

| | | | |
|---|---|---|---|
| 2,827,665 | 3/1958 | Rogers et al. | 260/2.5 BC X |
| 3,052,927 | 9/1962 | Hoppe et al. | 264/45.7 |
| 3,090,078 | 3/1963 | Ackles | 264/45.8 |
| 3,297,802 | 1/1967 | Powers | 264/45.7 |
| 3,301,926 | 1/1967 | Reiland | 264/46.6 X |
| 3,366,719 | 1/1968 | Lueders | 264/46.5 X |
| 3,389,519 | 6/1968 | Williams et al. | 264/46.5 X |
| 3,432,582 | 3/1969 | Bender | 264/46.5 X |
| 3,439,075 | 4/1969 | Bauer et al. | 264/46.7 |
| 3,444,279 | 5/1969 | Dost | 264/46.5 |
| 3,484,509 | 12/1969 | Keller | 264/46.5 X |
| 3,491,171 | 1/1970 | French | 264/46.5 |
| 3,551,947 | 1/1971 | Jennings | 264/51 X |
| 3,916,023 | 10/1975 | Porter et al. | 264/53 X |

FOREIGN PATENT DOCUMENTS

| | | | |
|---|---|---|---|
| 842,267 | 9/1952 | Germany | 264/46.2 |
| 2,257,661 | 5/1974 | Germany | 264/46.6 |

*Primary Examiner*—Philip Anderson
*Attorney, Agent, or Firm*—Gene Harsh; Joseph C. Gil; William E. Parry

[57] ABSTRACT

Cavities are filled with a foam insulating material by introducing the reaction mixture through the outlet nozzle of a mixing head which is drawn lengthwise through the cavity at a rate adapted to the rate of foaming, wherein the reactivity of the reaction mixture is accelerated during the filling procedure so that the reaction mixture is foaming up simultaneously over the length of the cavity.

3 Claims, 4 Drawing Figures

PROCESS FOR UNIFORMLY FILLING CAVITIES WITH A FOAM INSULATING MATERIAL

BACKGROUND OF THE INVENTION

This invention relates to a process for filling cavities, in particular the cavity between a conduit pipe and its jacket, with insulating material by introducing a liquid foamable reaction mixture, in particular one which forms a polyurethane foam, into the cavity. The apparatus used for this process consists of containers for the reactants from which pipes with pumps lead to a mixing head.

It is known to fill narrow cavities and insulate pipe conduits by using a mixing head with an insertion lance which is pushed into the gap between a pipe and its jacket and to slowly withdraw the mixing head while the cavity is filled with the reaction mixture. Although this method ensures that the mixture will always be introduced at the correct position so that it flows directly to the points where it is required to foam up, such an apparatus is very inconvenient to handle and is only suitable for short pipes of up to about 5 meters in length. For longer pipes additional equipment is needed to support the lance. Additionally, the lance must not be too long because the reaction may start to take place in the lance. Another serious problem with this apparatus is the cleaning of the lance between the individual operations. The loss of material and time is relatively high and consequently the apparatus is uneconomical.

It is therefore an object of this invention to provide a process which is suitable for filling longer cavities and which is designed such that the time at which the reaction mixture starts to react is accelerated from the beginning of the filling procedure to its end so that the mixture foams up simultaneously over the length of the cavity. The process may be employed, for example, for filling long, slender hollow bodies such as structural elements, safety planks or tubes with foam. When used for insulating pipes, the foam will adhere on all sides to both the pipe enclosed by it and to the jacket around it. In addition, the process should be applicable to seamless pipe jackets.

STATEMENT OF THE INVENTION

According to the invention, this problem is solved by introducing the reaction mixture through the outlet nozzle of a mixing head which is drawn lengthwise through the cavity by accelerating the reactivity of the reaction mixture during the filling procedure so that the mixture foams up simultaneously over the length of the cavity. This is caused by increasing the amount of catalyst in the reaction mixture.

Apart from the insulating material based on polyurethane already mentioned above, the process may also be used for producing insulating materials based on polyester resins, phenol resins and epoxy resins. Thermoplasts containing blowing agents may also be used as insulating materials in this process by mixing the thermoplast with the blowing agent inside the mixing head.

The hollow body is preferably kept inclined at an angle of about 3° to 20° during introduction of the mixture. This ensures that the air in the cavity can be expelled and that the mixture introduced into the cavity will not flow against the mixing head.

An example of the apparatus according to the invention for carrying out the process comprises containers for the reactants, from which pipes with pumps connected along their lengths lead to a mixing head.

A section of the pipes adjusted to the maximum length of a cavity which is to be filled with foam consists of flexible tubes and the mixing head is constructed as a carriage. A rigid bearing is preferably provided for the hollow body. The novelty of the apparatus is that the pump for the catalyst is supplied with a servomotor adapted to vary (accelerate) the throughput of the pump from the beginning of the filling procedure to its end.

Instead of flexible tubes a section of the pipes adjusted to the maximum length of hollow body which is to be filled with foam may consist of a rigid transverse arm and may be provided with a displaceable bearing for the hollow body.

In the first embodiment, the mixing head can be pulled through the hollow body. In the second embodiment, the bearing, together with the hollow body, is displaced during introduction of the reaction mixture. This embodiment is clearly not suitable for pipe conduits which have already been laid. In both cases, relative movement between the hollow body and the mixing head takes place. It is, therefore, in principle immaterial whether it is the mixing head or the hollow body which is displaced.

In contrast to the known method of introducing the reaction mixture with a lance, in this process and apparatus the mixture is applied directly from the mixing head, i.e. immediately after mixing, to that position in the cavity where it is required to foam up. Long flow paths with superimposition of different layers resulting in an uneven foam are thereby avoided.

The flexible tubes are preferably equipped with a winding device which can be driven at an adjustable velocity so that the rate of feed of the mixing head which consists of a carriage can be accurately adjusted and maintained constant during the foaming process.

Alternatively, according to the second embodiment of the apparatus, the bearing for the hollow body can be driven at an adjustable velocity.

The mixing head is preferably provided with rollers. But it may alternatively be equipped with skids.

When insulating fairly short lengths of pipe, the pipe can be centered in the jacket at both ends. In the case of long pipes, the pipe and the jacket are liable to sag by different amounts if the pipe is centered only at the ends. The pipe is, therefore, preferably covered with spacer pins which are arranged so that they do not obstruct the movement of the mixing head. For example, they may be so arranged that there are three pins at intervals of 120° in one cross-section. The uppermost pin would then be placed vertically so that the lower part of the cavity is left free for the mixing head. The mixing head is in this case preferably provided with suitable chamfered surfaces so that in the event of contact with the pins it will be centered in the correct position. These spacer pins are preferably also made of insulating material or at least of material with a low thermal conductivity. They may be glued to the pipe or inserted in holders welded to the pipe. Considerable lengths of pipe or even pipes which have already been laid can be insulated with foam produced in situ by this method.

Introduction of the mixing head with the flexible tubes into the pipe jacket is most simply achieved by holding the pipe and jacket obliquely and letting the mixing head slide into the cavity. It is also very advantageous to introduce the mixing head by securing it at the end of the conduit pipe which is to be introduced into the jacket and then pushing it into the jacket together with the pipe. At the end of the foaming process, it is then withdrawn by pulling it in the opposite direction.

An apparatus for carrying out the process according to the invention is illustrated in the drawing and described below with reference to the example of filling a cavity between a conduit pipe and a jacket with foam.

DESCRIPTION OF THE PREFERRED EMBODIMENTS

Figure 1:
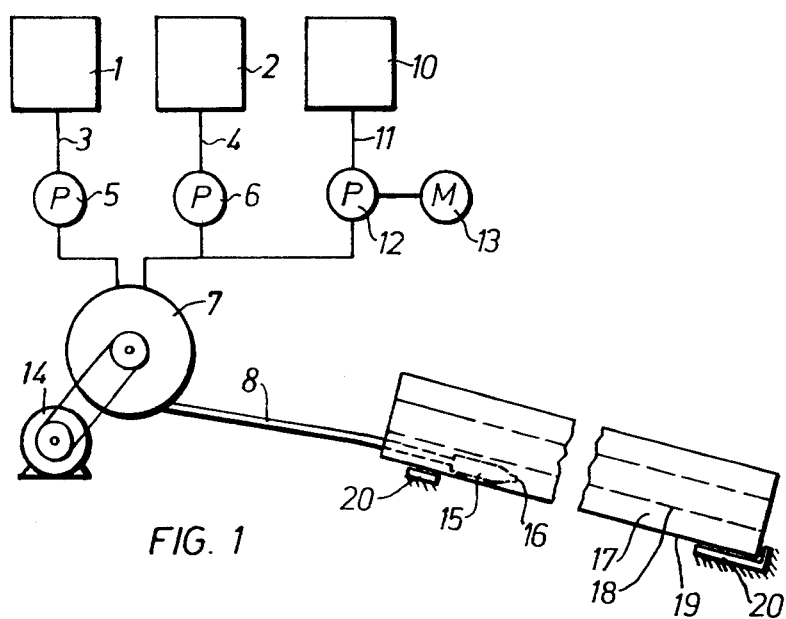
FIG. 1 is a schematic representation of a first example of the apparatus.
Figure 2:
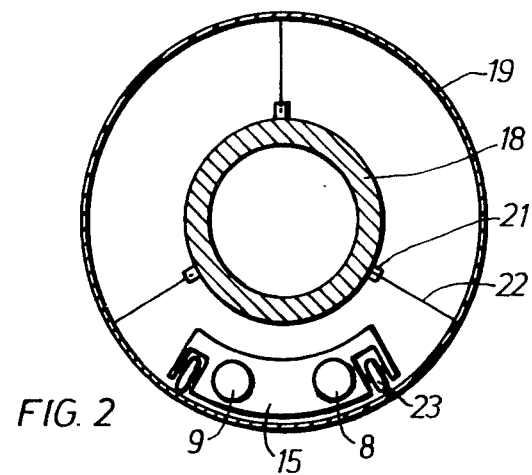
FIG. 2 is a rear view of the mixing head constructed as a carriage in a cavity between a conduit pipe and its jacket.
Figure 3:
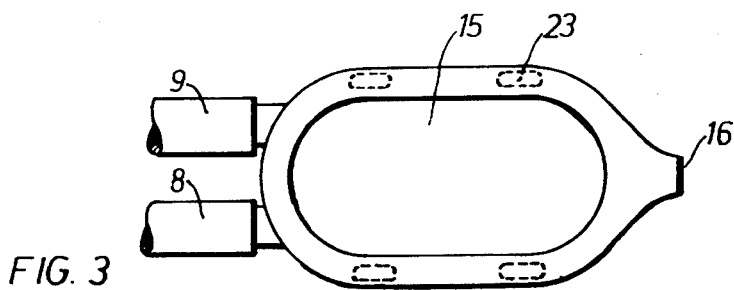
FIG. 3 is a top plan view of the mixing head of FIG. 2.

In FIGS. 1 to 3, the reactants flow from containers 1 and 2 through pipes 3 and 4 which contain pumps 5 and 6 to a winding device 7 for the flexible tubes 8 and 9. A catalyst flows from the container 10 through pipe 11 into pipe 4. The pump 12 is supplied with a servomotor adapted to vary the throughput during working. The pipes 3 and 4 open into this winding device 7, and the components enter their respective flexible tubes 8 and 9 through slide ring packings known per se. The winding device 7 is adapted to be driven by a drive 14 in such a manner that the mixing head 15 into which the tubes 8 and 9 open can be pulled at a uniform velocity. The mixing head 15 comprises a mixing chamber into which the components can be injected and an outlet nozzle 16 from which the finished mixture is ejected. In enters a cavity 17 which is enclosed by a conduit pipe 18 and a jacket 19 around it. This cavity 17 is filled with such a quantity of reaction mixture that it will be filled with insulating foam after completion of the reaction. The two pipes 18 and 19 are mounted on bearing blocks 20 in such a manner that they are inclined at an angle of between 3° and 20°. Supports 21 are welded to the conduit pipe 18 and spacer pins 22 are held in these supports (see FIG. 2). The mixing head 15 is equipped with wheels 23 which are mounted in such a manner that they automatically keep to their track when the mixing head is withdrawn.

Figure 4:
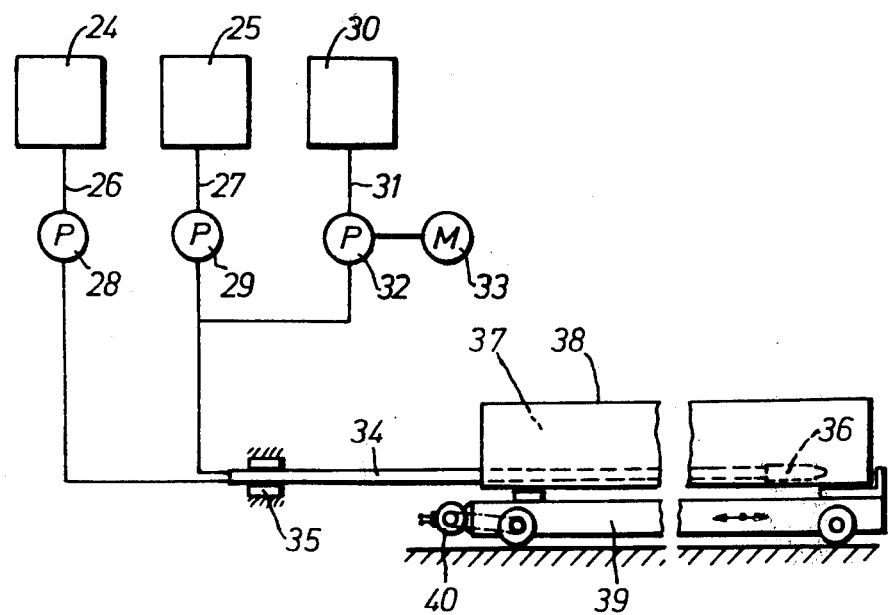
FIG. 4 is a schematic view of a second example of the apparatus.

In FIG. 4, the reactants flow from the containers 24 and 25 through pipes 26 and 27 which contain pumps 28 and 29. The catalyst flows from container 30 through pipe 31 into pipe 27. The pump 32 is supplied with a servomotor 33 adapted to vary the throughput of the pump. The pipes 26 and 27 continue into a transverse arm 34 which is rigidly clamped in a bearing 35 and carries a slim mixing head 36 at its free end. The arm 34 with mixing head 36 extends into cavity 37 of a hollow body 30. The hollow body 38 rests on a displaceable bearing 39 which is equipped with a drive 40 and is displaced during introduction of the reaction mixture so that the hollow body is continuously filled with foam.

While the invention has been described in conjunction with specific embodiments thereof, it is evident that other alternatives, modifications, and variations may be apparent to those skilled in the art in light of the foregoing description. Accordingly, it is intended to embrace all such alternatives, modifications, and variations as fall within the spirit and scope of the appended claims.

EXAMPLE 1

By use of the aforementioned process and apparatus, an insulated pipe is produced. The pipe has a length of 3 m. The conveying (inner) pipe is of steel with 50.8 mm inner diameter and of 60.3 mm outer diameter. The jacket pipe is of rigid polyethylene with an outer diameter of 160 mm and an inner diameter of 141.8 mm. The thickness of insulation layer is about 40 mm and made of polyurethane with a density of 50 kg/m$^3$.

The following recipe was used:
100 parts by weight of a polyol formulation consisting of
  80 parts by weight of polyether started on 1,1,1-trimethylolpropane (OH-number 550),
  10 parts by weight of polyether started on ethylenediamine (OH-number 470),
  10 parts by weight of 1,1,1-trimethylolpropane (OH-number 1250),
  20 parts by weight of trichloro-ethylphosphate,
  0.75 parts by weight of Na-salt of sulphonated castor oil,
  0.75 parts by weight of water,
  2 parts by weight of silicone stabilizer (L 520 of UNION CARBIDE CORPORATION);
20 parts by weight of blowing agent monofluortrichloro-methane;
1 part by weight of dimethylbenzylamine as catalyst;
130 parts by weight of polymethylene-polyphenyl-polyisocyanate, NCO-content of approximately 31%.

The time for start of reaction was 16 sec., the reaction time 85 sec.

A machine of the type HK 165 of MASCHINENFABRIK HENNECKE GMBH of St. Augustin, Federal Republic of Germany, was used. The machine has a total output of 18,900 g/min. The throughput of the polyol pump was 9,025 g/min, that of the catalyst pump 75 g/min and that of the isocyanate pump 9,800 g/min. The travel speed of the mixing head was 30 m/min. The time for filling the pipe with the reaction mixture was 6 sec.

The advance movement of the mixing head was continuous. In view of the relative short length of the pipe, it was not necessary to change the activity of the reaction mixture during the filling procedure.

EXAMPLE 2

The same process and apparatus as in Example 1 is used. The pipe has a length of 6 m. The conveying (inner) pipe is of steel with 77.2 mm inner diameter and 88.9 mm outer diameter. The jacket pipe is of rigid polyvinylchloride with 200 mm outer diameter and 192 mm inner diameter. The thickness of the insulation layer is 51.5 mm. The insulation material is polyurethane foam with a raw density of 45 kg/m$^3$.

The following recipe was used:
  100 parts by weight of the polyol formulation described in Example 1;
  25 parts by weight blowing agent monofluortrichloro-methane;
  0.5 – 2 parts by weight of dimethylbenzylamine as catalyst (variable);
  130 parts by weight of the isocyanate described in Example 1.

The time for start of the reaction is 22 sec. with 0.5 parts by weight of catalyst and 10 sec. with 2 parts by weight.

The reaction time is 100 sec. with 0.5 parts by weight of catalyst and 55 sec. with 2 parts by weight.

The same machine as in Example 1 is used. The machine has a total output of 31,800 g/min, that of the polyol pump is 15,550 g/min, that of the catalyst pump is 62 to 248 g/min which is continuously variable.

The isocyanate pump delivers 16,150 g/min. The travel speed of the mixing head is 30 m/min. The time for filling the pipe with the reaction mixture is 12 sec. The advance movement of the mixing head is continuous. To ensure that the reaction mixture foams up simultaneously the amount of catalyst is accelerated during the filling time from 0.5 to 2.0 parts by weight. The catalyst pump is supplied with a servomotor so that the output can be varied during the time of 12 sec. from 62 to 248 g/min. The pipe to be insulated is in horizontal position during the filling procedure.

EXAMPLE 3

A security plank for highways of a metal sheet profile must be filled with polyurethane foam for stiffening. The length of the plank is 16 m; the free cross-section 415 cm$^2$, the foam raw density is 40 kg/m$^3$.

The following recipe was used:

100 parts by weight of a polyol formulation consisting of
 80 parts by weight of polyether started on 1,1,1-trimethylolpropane (OH-number 380),
 10 parts by weight of polyether started on 1,1,1-trimethylolpropane and propanediol-(1,2) (OH-number 56),
 10 parts by weight of trichloro-diphenylphosphate,
 0.5 parts by weight of Na-salt of sulphonated castor oil,
 0.5 parts by weight of water,
 1 part by weight of silicone stabilizer;
 30 parts by weight of blowing agent monofluortrichloromethane;
 0.1 – 2.5 parts by weight of dimethylbenzylamine as catalyst (variable);
 130 parts by weight of the isocyanate described in Example 1.

The start time for reaction is 45 sec. with 0.1 parts by weight of catalyst and 8 sec. with 2.5 parts. The reaction time is 250 sec. with 0.1 parts by weight of catalyst and 37 sec. with 2.5 parts.

The same type of foaming machine was used (HENNECKE HK 245). The total output was 43,500 g/min. The output of the polyol pump was 21,750 g/min, that of the catalyst pump 17 to 420 g/min (variable), that of the isocyanate pump 21 to 750 g/min. The travel speed of the mixing head is 25 m/min. The time for filling is 38 sec.

The advance movement of the mixing head is continuous. The amount of catalyst is accelerated from 0.1 to 2.5 parts by weight. Therefore, the output of the amount of catalyst must be varied within 38 sec. from 17 to 420 g/min by the servomotor.

What is claimed is:

1. A process for filling a cavity with insulating material, comprising introducing a liquid, foamable reaction mixture into the cavity through the outlet nozzle of a mixing head while simultaneously drawing the mixing head through the cavity and accelerating the reactivity of the reaction mixture from the beginning of the filling procedure to its end by increasing the amount of catalyst to the foamable reaction mixture.

2. The process of claim 1 wherein said cavity is formed between a conduit pipe and a jacket surrounding it.

3. The process of claim 1, wherein the cavity is inclined at an angle of between 3° and 20° during introduction of the mixture.

* * * * *